United States Patent
Laukkanen et al.

(10) Patent No.: US 9,469,696 B2
(45) Date of Patent: Oct. 18, 2016

(54) METHOD FOR PROCESSING NANOFIBRILLAR CELLULOSE AND PRODUCT OBTAINED BY THE METHOD

(75) Inventors: Antti Laukkanen, Helsinki (FI); Jan-Erik Teirfolk, Turku (FI); Markus Nuopponen, Helsinki (FI)

(73) Assignee: UPM-KYMMEME CORPORATION, Helsinki (FI)

( * ) Notice: Subject to any disclaimer, the term of this patent is extended or adjusted under 35 U.S.C. 154(b) by 104 days.

(21) Appl. No.: 13/984,550

(22) PCT Filed: Feb. 8, 2012

(86) PCT No.: PCT/FI2012/050120
§ 371 (c)(1),
(2), (4) Date: Sep. 4, 2013

(87) PCT Pub. No.: WO2012/107642
PCT Pub. Date: Aug. 16, 2012

(65) Prior Publication Data
US 2013/0345416 A1 Dec. 26, 2013

(30) Foreign Application Priority Data
Feb. 10, 2011 (FI) ..................... 20115131

(51) Int. Cl.
| | | |
|---|---|---|
| D21H 11/18 | (2006.01) | |
| D01D 5/06 | (2006.01) | |
| D01F 2/00 | (2006.01) | |
| C08B 15/04 | (2006.01) | |
| B01J 13/00 | (2006.01) | |

(52) U.S. Cl.
CPC ............ *C08B 15/04* (2013.01); *B01J 13/0069* (2013.01); *D01D 5/06* (2013.01); *D01F 2/00* (2013.01); *D21H 11/18* (2013.01)

(58) Field of Classification Search
CPC ........... D21H 11/18; D01D 5/06; D01F 2/00
USPC ........................................................ 536/85
See application file for complete search history.

(56) References Cited

U.S. PATENT DOCUMENTS

| 4,256,111 A | 3/1981 | Lassen | |
|---|---|---|---|
| 4,481,076 A * | 11/1984 | Herrick ................. | D21C 9/002 |
| | | | 162/100 |
| 5,530,111 A | 6/1996 | Glasser et al. | |
| 6,190,501 B1 | 2/2001 | Tanaka et al. | |
| 2011/0086236 A1* | 4/2011 | Catchmark ........ | C07K 14/4732 |
| | | | 428/478.2 |
| 2011/0117319 A1 | 5/2011 | Yano et al. | |
| 2011/0263840 A1 | 10/2011 | Turner et al. | |

FOREIGN PATENT DOCUMENTS

| EP | 0 859 011 B1 | 5/2001 |
|---|---|---|
| JP | 2003-082535 A | 3/2003 |
| JP | A-2010-209510 | 9/2010 |
| JP | A-2010-242063 | 10/2010 |
| WO | WO 01/66600 A1 | 9/2001 |
| WO | WO 2009/084566 A1 | 7/2009 |
| WO | WO 2010/001829 A1 | 1/2010 |
| WO | WO 2010/043889 A1 | 4/2010 |
| WO | WO 2010/134357 A1 | 11/2010 |
| WO | WO 2010/134868 A1 | 11/2010 |
| WO | WO 2010/142845 A1 | 12/2010 |

OTHER PUBLICATIONS

Capadona et al., "A Versatile Approach for the Processing of Polymer Nanocomposites with Self-Assembled Nanofibre Templates," *Nature Nanotechnology*, Dec. 2007, vol. 2, pp. 765-769.
Iwamoto et al., Structure and Mechanical Properties of Wet-Spun Fibers Made from Natural Cellulose Nanofibers, *Biomacromolecules*, 2011, vol. 12, pp. 831-836.
Habibi et al., "Cellulose Nanocrystals: Chemisty, Self-Assembly, and Applications," *Chem. Rev.*, 2010, vol. 110, pp. 3479-3500.
Jin et al., "Nanofibrillar Cellulose Aerogels," *Colloids and Surfaces*, 2004, vol. 240, pp. 63-67.
International Search Report issued in International Patent Application No. PCT/FI2012/050120 dated Jun. 6, 2012.
Written Opinion issued in International Patent Application No. PCT/FI2012/050120 dated Jun. 6, 2012.

* cited by examiner

*Primary Examiner* — Patrick Lewis
*Assistant Examiner* — Everett White
(74) *Attorney, Agent, or Firm* — Oliff PLC

(57) ABSTRACT

The invention relates to a method for processing an aqueous gel of nanofibrillar cellulose by removing water from the aqueous gel by means of an organic solvent miscible with water. In the method: aqueous gel is introduced into a volume of organic solvent miscible with water in a controlled manner so that the aqueous gel is kept as a separate phase and forms discrete physical entities containing the nanofibrillar cellulose within the phase; water is changed with the organic solvent in said discrete physical entities of nanofibrillar cellulose; and the physical entities are separated from the volume of organic solvent.

14 Claims, 7 Drawing Sheets

METHOD FOR PROCESSING NANOFIBRILLAR CELLULOSE AND PRODUCT OBTAINED BY THE METHOD

FIELD OF THE INVENTION

The present invention relates to a method for processing aqueous gel, or "hydrogel" of nanofibrillar cellulose by removing water from it. The invention also relates to a nanofibrillar cellulose product obtained by this method.

BACKGROUND OF THE INVENTION

Nanofibrillar cellulose (NFC) consists of isolated cellulose microfibrils or microfibril bundles derived from cellulose raw material. NFC is based on a natural polymer that is abundant in nature. Nanofibrillar cellulose has many potential uses for example based on its capability of forming viscous gel in water (hydrogel).

NFC production techniques are based on grinding (or homogenization) of aqueous dispersion of pulp fibers. The concentration of NFC in dispersions is typically very low, usually around 1-5%. After the grinding process, the obtained NFC material is a dilute viscoelastic hydrogel. The material itself is usable as such in many applications, but logistic costs are too high to transport the material from the production site. In some applications, the high water content is not acceptable, i.e. the formulations do not tolerate large amounts of water.

Thus, there is an evident need for increasing the concentration of the final product so that the transport costs would be decreased and the NFC could be used in the final destination at a suitable concentration desired by the end user by simply redispersing the NFC in water.

Concentration or drying of NFC hydrogel is challenging, however. The specific surface area of NFC is very high due to its nanoscopic dimensions. Respectively, strong water retention is natural for NFC since water is bound on the surfaces of the fibers through numerous hydrogen bonds. Conventional separation techniques, such as filtration or evaporation are not feasible with NFC hydrogels, at least not on industrial level. The problem is widely recognized and heavily studied but not really solved.

The fundamental problem in mechanical water removal is the ability of NFC hydrogel to form a very dense and impermeable nanoscale membrane around itself, for example during filtration. The formed shell prevents diffusion of water from the gel structure, which leads to very slow concentration rates. The same applies to vacuum evaporation where the skin formation blocks the evaporation of water.

Another problem in drying of NFC is the non-redispersibility of the dried nanofibers. During the water removal, the NFC-water bonds are replaced with NFC-NFC interactions and the fibers are permanently aggregated. This can be prevented with the use of certain additives during the drying stage, such as CMC, or by chemical modification of the microfibril surface, e.g. oxidation or carboxymethylation. With those methods NFC can be re-activated after complete drying.

In the literature, the use of organic solvents in separation of MFC from water has been described. The proposed processes have been based on precipitation of dilute NFC dispersion into a non-solvent, such as isopropanol. Precipitation is typically carried out from dilute solutions with high speed mixing.

For example international publication WO0166600 describes a process where quaternary amine functionalized cellulose gel is added to isopropanol while stirring, at a rate of 1 gram 1% aqueous gel/2 ml isopropanol, whereafter the slurry is filtered through a synthetic straining cloth. After the filtration has gone about as far as it can, the wet filter cake is again dispersed in fresh amount of isopropanol at the same ratio, stirred, filtered and dried in an oven. Thus, the cake obtained after the first filtering step is still described as wet and must be treated once again with isopropanol.

According to European patent EP-0859011, a transparent viscous gel consisting of microfibrils of cationic cellulose is prepared, whereafter the drying can be performed by adding isopropanol or ethanol, or any other solvent having dewatering capability, to a 3% aqueous gel, whereafter the dehydrated microfibrils of cationic cellulose are recovered by filtration and dried in an oven. In this way a powder that maintains the rheological properties when redispersed in water is obtained. In Example 7 of this patent, a 3% viscous transparent gel of microfibrils of cationic cellulose is precipitated in isopropanol, filtered and dried in an oven to obtain dry product that recovers its original rheological properties upon addition of water.

In our experiments this protocol has been tested and found problematic. NFC is able to form colloidally stable dispersions also in alcohol media and filterability has not been improved as much as could be expected.

The article by Capadona J. R. et al. "A versatile approach for the processing of polymer nanocomposites with self-assembled nanofibre templates", Nature Nanotech. 2, 765-769 (2007) describes gels made of nano-scale cellulose whiskers which are obtained through acid hydrolysis of tunicate mantles. The whiskers exist initially in aqueous dispersion and they are made to an organogel in a sol-gel process through solvent exchange with a water-miscible solvent, whereafter the gel is filled with a matrix polymer by immersing the gel in a solution of the polymer and dried. During the gel-forming step acetone was introduced on top of the aqueous whisker dispersion without mixing the layers. The acetone was exchanged daily and the acetone layer was gently agitated to promote the solvent exchange. After some days the acetone organogel was obtained, placed into a solution containing a polymer and dried after removal from the solution. The article also reports the use of acetonitrile, ethanol, methanol, isopropanol and tetrahydrofuran as solvents for making the organogel. The gel forming step through solvent exchange takes typically many days.

SUMMARY OF THE INVENTION

It is a purpose of the invention to provide a new method where the nanofibrillar cellulose can be dewatered by water-miscible solvents in a process which is faster and offers more possibilities for the further processing of the nanofibrillar cellulose to final products.

It has now been found that water can be extracted from NFC hydrogels using a water miscible solvent, e.g. ethanol as an extraction agent by a practical method which reduces the drying time and makes it possible to manufacture a variety of products starting from the NFC hydrogel.

The core idea of the invention is to carefully distribute NFC gels, as obtained from manufacturing process, into a water miscible solvent so that they remain as physical entities. This can be done by extruding or spraying the gel to the solvent to make e.g. "worm" or "sphere"-like objects out of the gel, or by supplying the gel in larger "blocks" to the solvent and breaking them to smaller particles in the solvent. These blocks can be crumbled into smaller entities in the solvent volume mechanically for example by agitating. The form of the entities depends on the way of supplying the NFC into the solvent. With a proper technique, the water in the NFC hydrogels can be completely changed into e.g. ethanol. In the second stage of the process, the entities are separated physically from the solvent volume, and the remaining solvent and possible residual water is removed from them by a suitable drying method, for example in vacuum and/or elevated temperature (higher than 25° C.), and dry NFC is obtained. The drying can take place also by pressure filtration. A combination of these methods is also possible, for example initial drying by pressure filtration and final drying by vacuum and/or elevated temperature. The total process time starting from the supply of the hydrogel into the solvent and ending in obtaining the dried product after the drying step is of the order of some hours, preferably not longer than two hours. During the drying the entities also shrink to their final dimensions.

The hydrogel is introduced in the organic solvent carefully so that it remains coherent and does not become dispersed, that is, a phase boundary of the gel against the solvent volume exists the whole time after the contact of the hydrogel with the solvent, although the phase boundary may change due to disintegration of larger gel entities, such as or blocks, into smaller ones in the solvent.

When the water is exchanged with the solvent in the solvent volume, the physical entities keep their original dimensions and the shapes where the gel was initially supplied to the solvent volume, or the dimensions and shapes change to the final dimensions and shapes of the entities due to the disintegration of the original gel entities. In both cases a small shrinkage may also occur. During this solvent exchange process, the NFC nanofibrils contained in the gel are stabilized to a coherent structure, where, however, a certain porosity exists. Due to this porosity the evaporation of the solvent is easy after the physical entities are separated from the solvent volume.

The NFC product obtained after the separation of the entities from the solvent volume can also be left with the remaining solvent and possible residual water in its structure, and it can be subsequently packed and shipped later to the end user as a solid "semi-dry" product.

The organic solvent that is used for the solvent exchange with the water of the hydrogel is any solvent that is miscible with water and preferably has moderate polarity. Suitable solvents are water-miscible alcohols including but not limited to methanol, ethanol and isopropanol, as well as dioxane and THF. The exchange of the water with the solvent leads to an enforcement of the hydrogen bonds between the NFC fibrils and to mechanical stabilization of the physical entities formed.

Preferred solvent is ethanol, which has low toxicity, low heat of evaporation (904 kJ/kg vs. 2256 kJ/kg for water) and exothermic mixing reaction with water (−777 J/mol at 25° C.) which lowers the energy demand.

The main advantages of the invention are the following:
NFC can be dried without lengthy filtering operations and without need to evaporate water, because organic solvent having a lower heat of evaporation is evaporated instead;
dried NFC can be transported in a form of particles which are easy to handle and can redispersed in water at the site of use.

During the introduction of the hydrogel into the solvent, the stirring or agitation, if used, must be careful in order to avoid the dispersing of the NFC hydrogel into the solvent so that the hydrogel is maintained as discrete physical entities.

One possibility is to supply the hydrogel through a port that comprises several orifices or nozzles, and the shape of the entities in the solvent volume is thus determined by the shape of the orifices or nozzles and by the supply rate of the hydrogel into the solvent. The port is preferably immersed in the solvent volume so that the hydrogel is immediately in contact with the solvent after issuing from the orifices or nozzles. The supply rate can be even and continuous, in which case continuous physical entities are formed in the solvent, or intermittent, which creates discontinuous entities, for example beads.

Another possibility is to disintegrate the hydrogel while in the solvent. In this case the hydrogel is supplied in larger blocks into the solvent volume, whereafter it is disintegrated to the physical entities mechanically so that the phase boundaries remain between the solvent and the NFC. This can be done for example by the blades of the agitator. The NFC hydrogel can for example be disintergrated in a smaller volume of the solvent, whereafter this solvent volume together with the physical entities formed is combined with a larger, final volume of the solvent and the solvent exchange process is completed in this volume of solvent.

According to one embodiment of the invention, the physical entities obtained are comminuted to a smaller size, for example particulate matter or powder which is an easily transportable form of dry NFC, which has retained its rheological properties. This comminuted form of the NFC can be used as a redispersable dry product, which the end user can make to a gel of desired concentration by simply adding water, preferably at the site of the use of the gel.

According to another embodiment, the physical entities are separated from the solvent volume, the remaining solvent and possible residual water is removed to form a dry product, or left in the entities to form a "semi-dry" product. This dry or "semi-dry" product where the physical entities are in their original shape and possibly only shrunk due to the drying, is another transportable product which is redispersable to a gel at the site of use by adding water.

BRIEF DESCRIPTION OF THE DRAWINGS

The invention will be explained in the following with reference to the enclosed drawings, where.

DETAILED DESCRIPTION OF THE INVENTION

Figure 1:
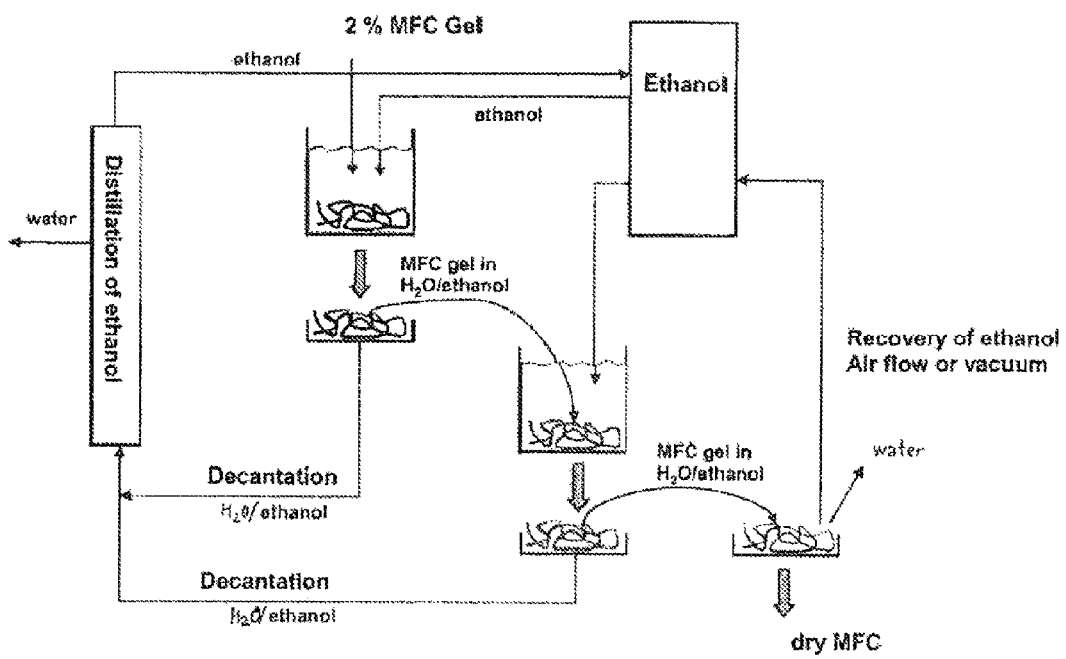
FIG. 1 is a scheme of a process where the method according to the invention is employed.

In this context, the term "nanofibrillar cellulose" or "nanofibrillated cellulose" (NFC for short) is used, it being understood that also "microfibrillar cellulose" or "microfibrillated cellulose" (MFC) or "nanocellulose" are commonly used terms for the substance to be described in more detail below.

The nanofibrillar cellulose consists of cellulose fibrils whose diameter is in the submicron range. It forms a self-assembled hydrogel network even at low concentrations. These gels of nanofibrillar cellulose are highly shear thinning and thixotrophic in nature.

The nanofibrillar cellulose is prepared normally from cellulose raw material of plant origin. The raw material can be based on any plant material that contains cellulose. The raw material can also be derived from certain bacterial fermentation processes. Plant material may be wood. Wood can be from softwood tree such as spruce, pine, fir, larch, douglas-fir or hemlock, or from hardwood tree such as birch, aspen, poplar, alder, eucalyptus or acacia, or from a mixture of softwoods and hardwoods. Non-wood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed. The cellulose raw material could be also derived from cellulose-producing micro-organisms. The micro-organisms can be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*.

The term "nanofibrillar cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 μm. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of microfibrillar cellulose from cellulose raw material, cellulose pulp, or refined pulp is carried out with suitable equipment such as a refiner, grinder, homogenizer, colloider, friction grinder, ultrasound sonicator, fluidizer such as microfluidizer, macrofluidizer or fluidizer-type homogenizer. In this case the nanofibrillar cellulose is obtained through disintegration of plant celluose material and can be called "nanofibrillated cellulose".

"Nanofibrillar cellulose" can also be directly isolated from certain fermentation processes. The cellulose-producing micro-organism of the present invention may be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*.

"Nanofibrillar cellulose" can also be any chemically or physically modified derivate of cellulose nanofibrils or nanofibril bundles. The chemical modification could be based for example on carboxymethylation, oxidation, esterification, or etherification reaction of cellulose molecules. Modification could also be realized by physical adsorption of anionic, cationic, or non-ionic substances or any combination of these on cellulose surface. The described modification can be carried out before, after, or during the production of microfibrillar cellulose, or any combination of these processes.

The nanofibrillated cellulose can be made of cellulose which is chemically premodified to make it more labile. The starting material of this kind of nanofibrillated cellulose is labile cellulose pulp or cellulose raw material, which results from certain modifications of cellulose raw material or cellulose pulp. For example N-oxyl mediated oxidation (e.g. 2,2,6,6-tetramethyl-1-piperidine N-oxide) leads to very labile cellulose material, which is easy to disintegrate to microfibrillar cellulose. For example patent applications WO 09/084566 and JP 20070340371 disclose such modifications.

The nanofibrillated cellulose is preferably made of plant material. One alternative is to obtain the nanofibrils form non-parenchymal plant material where the nanofibrils are obtained from secondary cell walls. One abundant source of cellulose nanofibrils is wood fibres. The nanofibrillated cellulose is manufactured by homogenizing wood-derived fibrous raw material, which may be chemical pulp. When NFC where the cellulose is modified cellulose is manufactured from wood fibres, the cellulose can be labilized by oxidation before the disintegration to nanofibrils. The disintegration in some of the above-mentioned equipments produces nanofibrils which have the diameter of only some nanometers, which is 50 nm at the most and gives a clear dispersion in water. The nanofibrils can be reduced to size where the diameter of most of the fibrils is in the range of only 2-20 nm only. The fibrils originating in secondary cell walls are essentially crystalline with degree of crystallinity of at least 55%.

Particularly preferred cellulose material to be used in the invention is cellulose derivative, where cellulose molecules in MFC contain some additional functional groups compared with the chemical structure of native cellulose. Such groups can be, by way of example only, carboxymethyl, aldehyde and/or carboxyl or quaternary ammonium. This kind of MFC samples are obtained e.g. by fibrillation of carboxymethylated, oxidated (N-oxyl mediated), or cationized cellulose pulp, respectively. The modification can be performed also during, or after fibrillation, or any combination of these. When a gel consisting of any of these modified MFC grades is introduced in the solvent, the gel remains more easily coherent than with a native cellulose based gel.

FIG. 1 shows the basic principle of a process that can be applied in industrial scale. Aqueous NFC gel, hydrogel, is introduced into a volume of organic solvent. The organic solvent used is miscible with the water. The solvent can also be a mixture of chemically different solvents. In the volume, the water in the hydrogel is exchanged with the solvent, that is, the water is extracted out of the gel and it is gradually replaced with the solvent. Thus, the volume of the solvent can be called an "extraction bath" for the NFC gel.

In industrial scale, the NFC gel is introduced into the extraction bath through a suitable port that allows the formation of discrete physical entities whose shape is determined by the port and the rate of introduction of the gel. The port may comprise several orifices through which the NFC hydrogel is extruded. The hydrogel can be introduced for example through an extruder with a suitable breaker plate that generates numerous elongate entities, hydrogel "worms" or ribbons, objects that can be generally called as "strings", in the extraction bath. Alternatively, spray nozzles could be used if the aim is to obtain small spheres or beads, in which case the hydrogel is introduced at short intervals, "dropwise", rather than as continuous strand. A port introducing the hydrogel in this way can comprise several spray nozzles in parallel from which the hydrogel issues as drops. The orifices or nozzles are preferably immersed in the extraction bath.

Another method for industrial application is to supply the NFC in larger blocks to the extraction bath and disintegrate it mechanically to the physical entities inside the bath. In this case the entites formed are more random in shape.

The concentraton of the NFC fibrils in the gel is preferably 0.5-5%, based on the total weight of the gel. However, higher concentrations are possible if the aim is to dewater the gel more efficiently or increase its strength to avoid its dispergation during the initial phases of the extraction process in the extraction bath.

For the physical entities made of the NFC hydrogel to remain in processable form in the solvent, their dimensions should be large enough. Without limiting the scope of the invention it can be estimated that the smallest dimension of the entity (such as diameter in the case of an elongate filament-like entity) in the extraction bath should be at least 100 µm, preferably at least 0.5 mm.

The solvent exchange process comprises preferably two or more steps. After the gel has been introduced into the solvent volume and the change of water with the solvent proceeds to a certain equilibrium state which depends on the relative amounts of the gel and solvent. Thereafter the physical entities are separated from the solvent volume and put into another volume of solvent to extract residual water from the entities. The physical entities are, because of their size, easily separable form each solvent volume by decantation or any other separation technique.

The solvent volumes which contain the extracted water from the hydrogel are regenerated by distillation, where water is separated, and the regenerated solvent can be recirculated back to the solvent exchange process.

The process can also be accomplished as a continuous process where the NFC hydrogel and NFC undergoes the same steps to final product as explained above.

After the solvent exchange process the physical entities are dried by allowing the solvent to evaporate from the entities. The physical entities may contain still some residual water, which evaporates easily without interfering with the drying process. The drying is preferably performed by forced gas drying at elevated temperature and/or vacuum (reduced pressure). The organic solvent released from the entities is collected, condensed and recirculated back to the solvent exchange process. During the drying the entities shrink from their original dimensions. The drying by temperature and/or vacuum can be preceded by pressure filtration which initially removes solvent and possible residual water.

After drying the physical entities can be comminuted by a suitable mechanical process to a final size. The dried NFC will be transported in this size to the end user for redispersion. However, the physical entities can be left to their original state where they where after the drying and transported in this state to the end user. The entities can also be left in a "semi-dry" state as explained above, for example by omitting one or more final drying stages. This may be feasible, if the end use of the redispersed NFC allows the presence of the organic solvent residues within the NFC or it may be even useful for the final use, that is, if the presence of the organic solvent in the redispersed NFC composition is desired. The NFC, whether dry or semidry, can be redispersed also to another solvent than water.

Manufacturing Examples with NFC

Starting Materials

The nanofibrillar cellulose raw material was functionalized cellulose where the cellulose had been oxidized by N-oxyl mediated oxidation prior to disintegration of the fibers to nanofibrillar cellulose. This material is called Ox-NFC in this application. Carboxymethylation and cationization was also used as alternative functionalization method prior to fibrillation. These materials are called as CM-NFC and Cat-NFC, respectively.

Example 1

General Example

Into 40 ml of 96% ethanol, 5 ml of 0.9% Ox-NFC was extruded through 1 mm hole using a syringe. In this concentration NFC formed a continuous hydrogel "worm" (diameter 1 mm). Immediately after soaking, the water started to diffuse into the ethanol phase, and ethanol into the NFC matrix. This process could be followed visually due to the differences in refractive index between ethanol and water. The process could be followed also by monitoring formation of gas bubbles—the solubility of dissolved air in the gel was decreased when ethanol entered into the NFC matrix and the gel started to bubble. In equilibrium state of the system, the "worm" should contain 0.9% NFC, 85% ethanol, and 14% water.

After 15 minutes, the "worm" could easily be lifted from the ethanol-water mixture into another 96% ethanol bath (40 ml) where the residual water was separated (5-15 minutes). The residual water content is dependent on relative volume fractions between water and ethanol in these stages—in the described case the residual water content is 5%. The needed extraction time is also dependent on the volume ratio because the driving force is the concentration gradient between the gel phase and the continuous ethanol rich phase. The gel strength of the "worm" was increased in ethanol, which stabilized the system in the extraction stage.

Surprisingly, the dimensions of the "worm" did not substantially change during the extraction. This means that the NFC gel is still in swollen state even in ethanol, which enables fast removal of ethanol by pressing, vacuum or air drying. After 30 minutes in atmospheric pressure the ethanol "worm" had been shrunken to a very thin thread-like filament. The shrinkage of the dimensions (diameter) in course of the drying is typically to one tenth of the original. The formed dry NFC could be ground into powdered form. Yield is very close to 100%.

The dried Ox-NFC obtained by the method was very hygroscopic. The material swelled in water within minutes even without mixing. The volume of the re-hydrated NFC gel was equal compared to the starting material, i.e. swelling ratio is at least 100%.

In the described process, water is extracted into the ethanol phase by a concentration gradient between the continuous phase and the gel phase. The process does not consume energy, actually mixing of water into ethanol is an exothermic reaction, i.e. at 298 K, up to 777 J/mol are set free. The cost of the process is composed of the energy that is needed to distill the diluted ethanol for recycling.

The volume of ethanol that is needed to be distilled in the process is relatively large. The heat of evaporation for ethanol is, however, much lower than for water (904 kJ/kg vs. 2256 kJ/kg).

Example 2

Extrusion Process 20 liter of 2.0 wt % NFC hydrogel (Ox-NFC, CM-NFC, or Cat-NFC) was extruded into 80 liters of ethanol with a commercial extrusion apparatus. The extrusion port consists of 440 circular (diameter 1 mm) output ports. The extruder nozzle was kept underneath the alcohol surface during the extrusion. After the extrusion stage, the mixture was stirred with a blade agitator with moderate rate. The long and entangled NFC coils or strings were diminished in length by the shear effect of the agitator.

After one hour, the solvent exchanged NFC coils were manually decanted and filtered through a coarse mesh (28 mesh). Finally, the NFC coils were dried in vacuum with a rotavapor into a dry coil-like product. Solid content of the product was 95% and yield 90%.

Example 3

Crumb Process

In this process the physical entities are formed by disintegrating from larger blocks supplied to the solvent volume. 1 liter of 2.0 wt % NFC hydrogel (Ox-NFC, CM-NFC, or Cat-NFC) was introduced into 4 liters of ethanol. The mixture was agitated with a commercial turbine blade agitator until the gel phase was crumbled into smaller gel entities. Size of the crumbled gel particles were typically between 0.5 mm to 5 mm in diameter. After the gel crumbs were formed, the mixture was gently mixed for one hour in order to allow solvent exchange to take place.

After one hour, the solvent exchanged NFC gel crumbs were manually decanted and filtered through a coarse mesh (28 mesh). Finally, the material was dried in vacuum with a rotavapor into dry particles. Solid content of the product was 95% and yield 90%.

Figure 2:
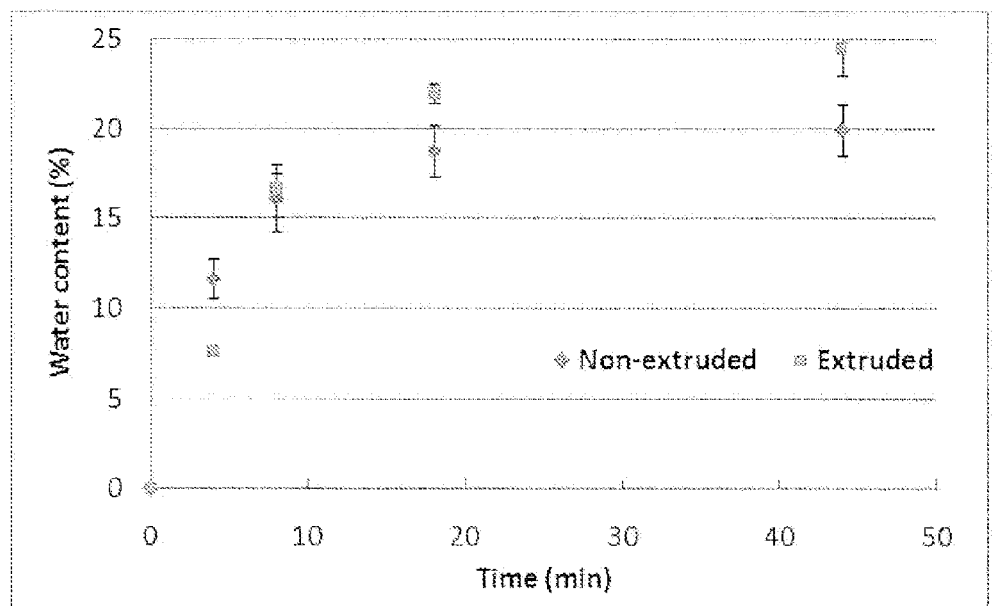
FIG. 2 is a graph showing water content of ethanol in course of solvent exchange.
Figure 3:
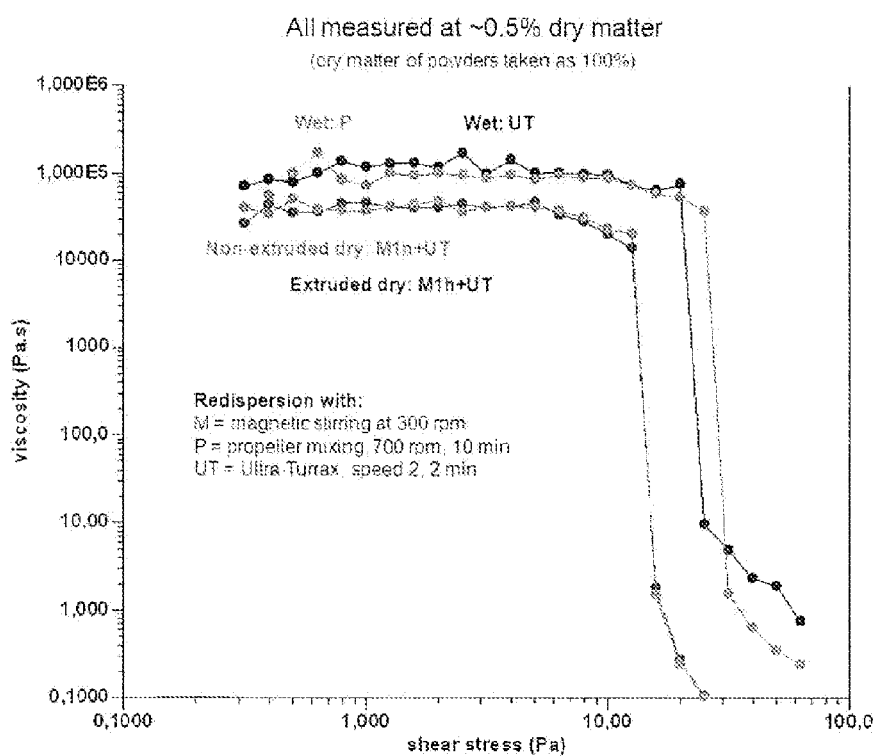
FIG. 3 is a graph showing the redispersion behavior of dried NFC obtained by a method according to the invention.

FIG. 2 shows how the water content of ethanol increases in course of the introduction of an aqueous 2% Ox-NFC gel into an ethanol bath, in proportion of one part gel/four parts ethanol (vol/vol). Both crumb and extrusion methods were used (marked "Non-extruded" and "Extruded"). The solvent volume was stirred in both cases during the introduction. The exchange of water and ethanol is driven by a concentration gradient such that concentration equilibrium is reached in both the NFC gel matrix and the solvent medium. At this point the amount of water in the ethanol bath should equal the amount of water within the gel. The water content of the ethanol bath at different times was determined with Karl Fischer titration of samples taken at different times. The figure shows how the mixture reaches the equilibrium plateau already after 20 minutes and the majority of water has diffused out of the gel entities. The figure also shows how the solvent exchange begins immediately after the aqueous gel is exposed to the solvent and the solvent exchange proceeds quickly during the 10 first minutes.
Redispersion of the NFC FIG. 3 shows the redispersion behavior of Ox-NFC which was extruded and dried or disintegrated (crumbled) and dried, as explained above by the examples 2 and 3. The graph shows flow curves as function of shear stress of redispersed Ox-NFC (samples "Non-extruded dry" and "Extruded dry") compared with the unprocessed hydrogel (Samples "Wet"). The samples measured were 0.5% dispersions of NFC in water. The dried samples were first hydrated with distilled water for one hour under magnetic stirring at 300 rpm, followed by subsequent mixing by Ultra-Turrax mixer at speed 2 for 2 min (M1h+UT). Fresh, that is, never dried Ox-NFC dispersion samples were prepared in the same concentration by propeller mixing (P) or by Ultra-Turrax (UT).

The graph shows very clearly how the dried NFC made by the extrusion method or crumb method provides dispersions which behave in the same manner as freshly made dispersions. The flow profiles of the redispersed samples are very close to the profile before drying (i.e., the profile of the freshly made dispersions).

Figure 4:
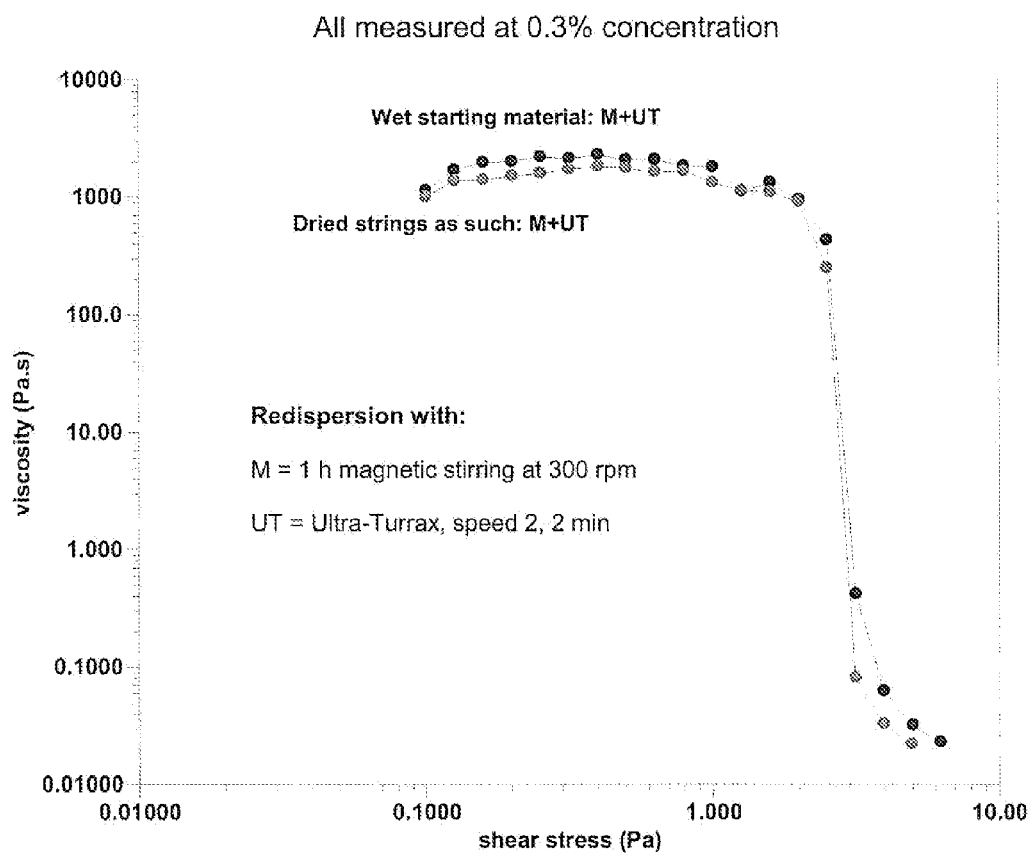
FIG. 4 is a graph showing the redispersion behavior of dried NFC of another type.

The same behavior can be observed with a NFC where the cellulose is chemically different modified cellulose. FIG. 4 shows the flow curve obtained with a 0.3% dispersion of CM-NFC. The dried NFC, which was in the form of strings made by the extrusion process was first hydrated with distilled water for one hour under magnetic stirring, followed by mixing with Ultra-Turrax mixer at speed 2 for 2 min. (M+UT). The wet sample was prepared in the same way in 0.3% concentration with fresh hydrogel as the starting material. The graph shows that dry CM-NFC made by the extrusion method, when redispersed by the aforementioned treatment, behaves like a fresh never dried NFC dispersion of the same concentration and the flow profiles are practically identical.

Figure 5:
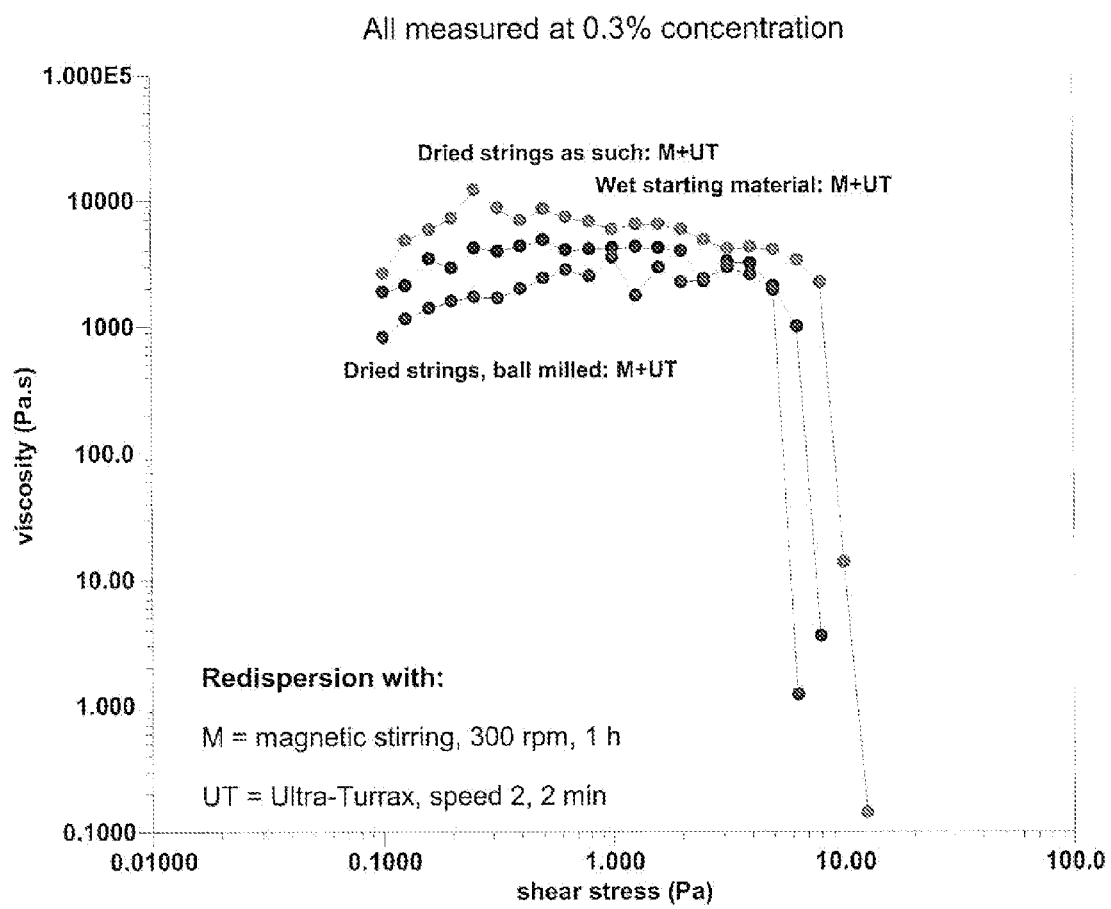
FIG. 5 is a graph showing the redispersion behavior of dried NFC of a third type.

FIG. 5 shows how the results are similar as above when the cellulose in the dried NFC is cationized cellulose (Cat-NFC), that is, the curve approaches the curve obtained with the fresh aqueous dispersion of the NFC having the same chemical cellulose structure but which has not undergone drying. Two dry samples of the cationic cellulose were used: dried strings as such obtained by the extrusion method and dried strings ball-milled to fine powder. The samples were prepared to final dispersion concentrations of 0.3% in the same way as in the example of FIG. 4, and the symbols for the treatments in FIG. 5 are the same as in FIG. 4.
Separation, Drying and Mechanical Processing After the physical entities are formed in the solvent volume by extrusion, by crumb process or in any other way, they are separated from the solvent volume, passed possibly one or more times through another solvent volume to extract remaining water, whereafter they are possibly dried. The entitities, once formed in the solvent volume, can also be comminuted to a smaller particle size either in wet state (containing the solvent) or in a dry state. Separation techniques include decantation, lifting, skimming, sedimentation, filtering through a coarse mesh etc.

After the separation, the remaining organic solvent and possible rest water can be removed totally or partially in a drying step. Drying can take place by evaporation using heat and/or reduced pressure. A preferred mechanical drying method is pressure filtration.

Figure 6:
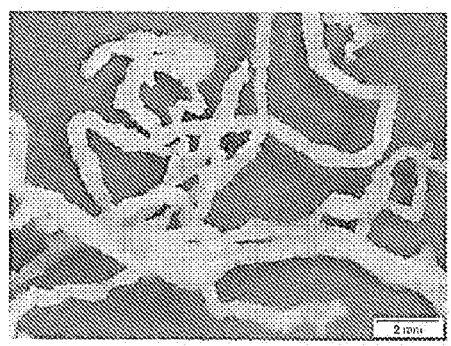
FIG. 6 is a microscope picture of dry unground NFC made according to the method of the invention.

FIG. 6 is a microscope picture of dry Ox-NFC made according to the method from initial dispersion of 1%. The extruded strings have shrunken from the original dimension during the drying.

Figure 7:
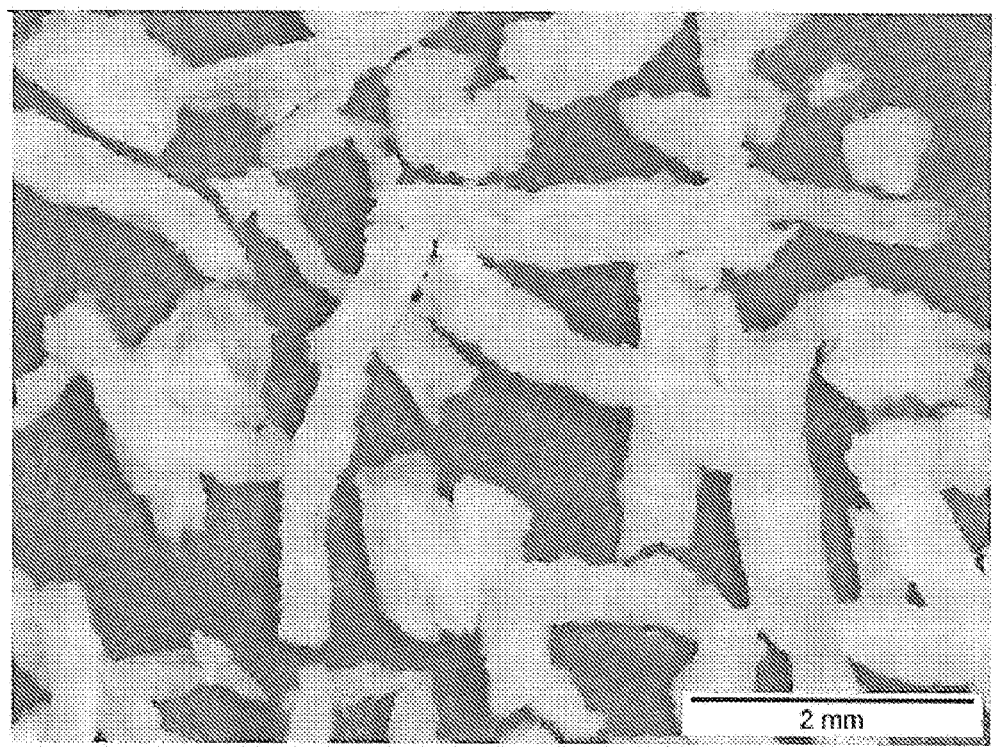
FIG. 7 is a stereomicrograph of dry ground NFC made according to the method of the invention.

FIG. 7 is a stereomicrograph of dry ground Ox-NFC. The dry strings made according to the method are ground in a mortar to make particulate matter which can be redispersed in water. However, to better retain the dispersibility, it is preferable to comminute Ox-NFC when it is still wet, either already in the solvent or after the NFC entities have been separated from the solvent when they still contain the absorbed solvent.

Figure 8:
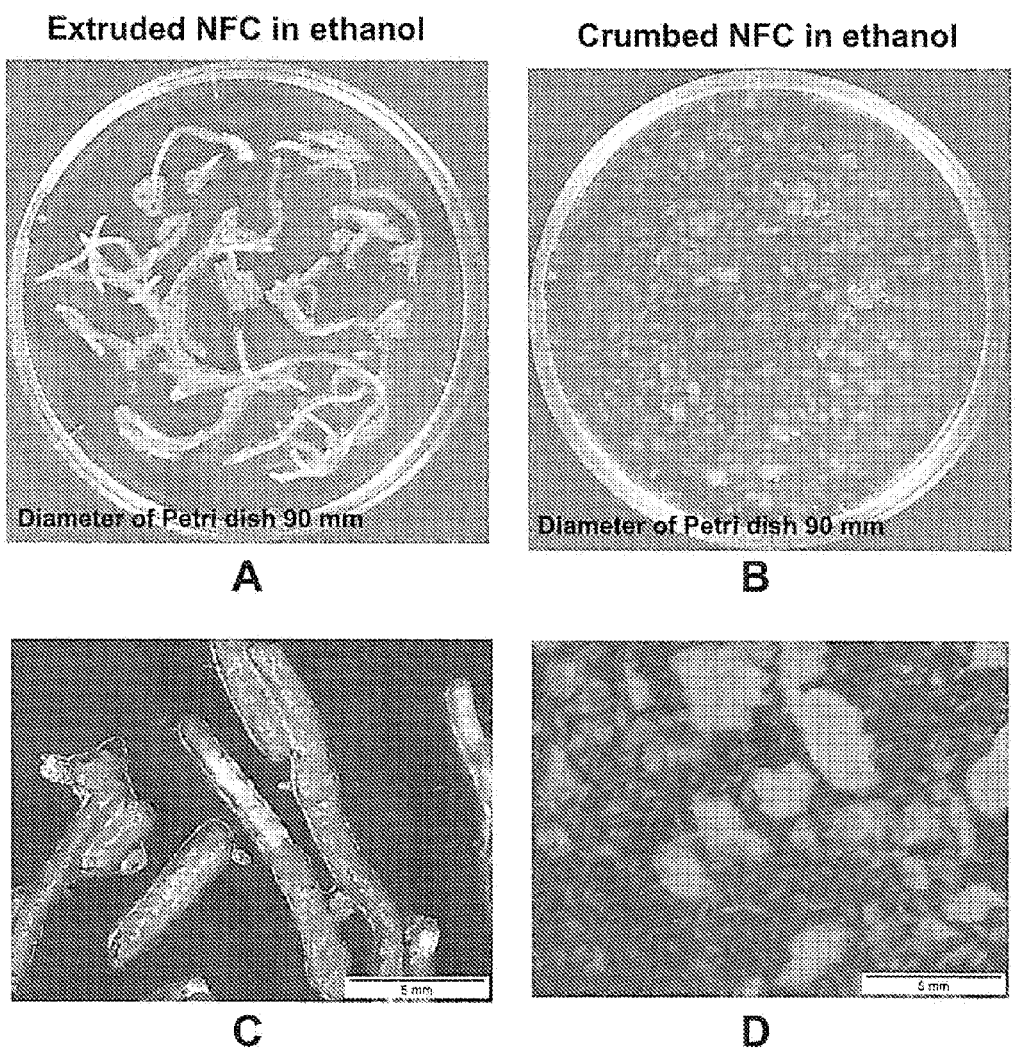
FIG. 8 shows samples of NFC in ethanol right after the solvent exchange.

FIG. 8 shows samples of the NFC in ethanol right after the solvent exchange. Top images A and B are photographs of extruded and crumbed NFC gel entities in a Petri dish, whereas bottom images C and D are stereomicroscopy images of the same.

Figure 9:
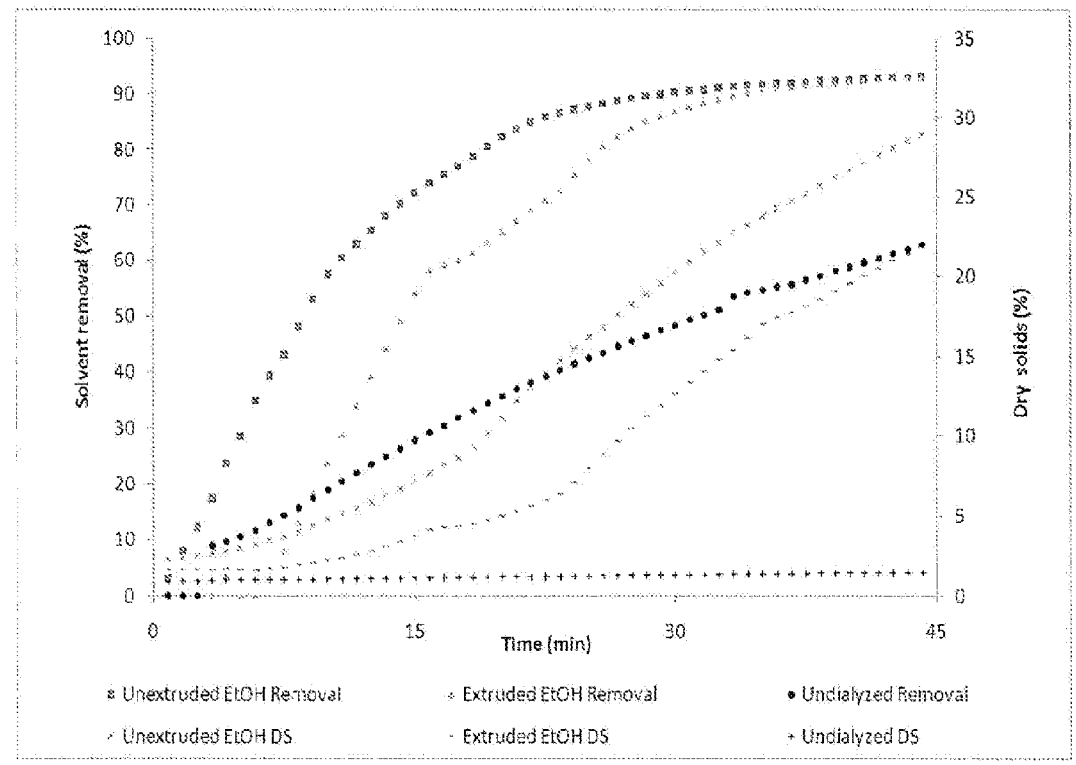
FIG. 9 shows a graph of solvent removal and dry solids increase of NFC in pressure filtration.

FIG. 9 shows a graph of solvent removal (EtOH removal) and dry solids increase (DS) of Ox-NFC in a pressure filtration experiment done at low pressure. The samples were physical entities made by the extrusion process ("Extruded") and physical entities made by the crumb process ("Unextruded") from a 1% NFC hydrogel to a bath of ethanol. The native gel matrix ("Undialyzed") was used as control.

The extruded sample reached a solids content of 22% after 45 minutes of filtration, while the unextruded sample reached 29% during the same time. If the result is compared to the situation of the original NFC hydrogel, the difference is remarakable: water from aqueous NFC hydrogel can not be removed with pressure filtration in any reasonable manner.

The process can be modified from the above-described process within the scope if the invention. There can be only one solvent-exchange step where water within the gel is exchanged with the solvent, or the number of steps can be two, three or more. Further, instead of forming continuous elongate "worms" or strings from the gel in the solvent-exchange process, the physical entities formed of the gel when it is introduced in the solvent volume can take the shape of flakes, beads, etc., depending on the method of supply, for example introduction rate combined with the port structure (orifices or nozzles), through which the hydrogel issues and which determines the shape of the physical entities, or the way of disintegrating the larger blocks of the hydrogel in the solvent in the so-called "crumb process". The physical entities formed of the gel in the solvent volume should be easily separable form the volume by simple methods such as decantation, lifting, skimming, sedimentation, filtering by a coarse mesh etc.

The port can be immersed in the volume of organic solvent, in which case the hydrogel comes in contact with the organic solvent immediately after it has issued from the port, or it can be separated from the volume, in which case the hydrogel enters air for a short while before coming in contact with the organic solvent.

The hydrogel serving as the raw material can, besides NFC and water, also contain other substances, which can be dissolved or dispersed in the gel, for example dispersion aids which end up in the dried product together with the NFC and may enhance the redispersibility of the dried NFC made by the method. It is also possible that the NFC contained in the gel may be a blend of various chemically different NFC grades.

The organic solvent used in the solvent volumes of two or several subsequent solvent-exchange steps need not necessarily be the same solvent chemically, provided that all solvents used are miscible with water. However, in view of the simplicity of the process and recovery and recycling of the solvent, the same solvent is preferred in all steps.

One or more additional substances can be incorporated in the redispersable product by adding it/them in the NFC hydrogel or in the solvent volume (extraction bath) where the NFC hydrogel is later introduced or in both the NFC hydrogel and the solvent volume.

The invention claimed is:

1. A method for processing an aqueous gel of nanofibrillar cellulose by removing water from the aqueous gel by means of an organic solvent miscible with water, the method comprising:
   introducing the aqueous gel into a volume of organic solvent miscible with water;
   mechanically disintegrating the aqueous gel into discrete physical entities in the volume of organic solvent;
   disintegrating the aqueous gel mechanically into discrete physical entities being performed in a controlled manner so that the aqueous gel is kept as a separate phase so that phase boundaries remain between the organic solvent and the discrete physical entities of nanofibrillar cellulose, which form separate particles in the volume of organic solvent;
   changing the water with the organic solvent in the discrete physical entities of nanofibrillar cellulose, and
   separating the discrete physical entities from the organic solvent.

2. The method according to claim 1, the method further comprising:
   at least partly drying the nanofibrillar cellulose by removing the organic solvent from the discrete physical entities of nanofibrillar cellulose after their separation from the volume of organic solvent.

3. The method according to claim 1, wherein changing the water with the organic solvent in the discrete physical entities comprises contacting the discrete physical entities subsequently with two or more physically different volumes of organic solvent.

4. The method according to claim 1, wherein the organic solvent is ethanol.

5. The method according to claim 1, wherein the nanofibrillar cellulose is made from functionalized cellulose.

6. The method according to claim 5, wherein the nanofibrillar cellulose contains aldehyde, carboxyl, carboxymethyl or cationic groups in the cellulose molecules.

7. The method according to claim 1, wherein after separating the physical entities from the volume of organic solvent, the physical entities are comminuted.

8. The method according to claim 7, wherein the physical entities are comminuted after removing the organic solvent at least partly from the physical entities.

9. The method according to claim 1, wherein the nanofibrillar cellulose after the separation of the physical entities from the volume of solvent is redispersed in water or other solvent.

10. The method according to claim 9, wherein the nanofibrillar cellulose is transported to a site of use and it is redispersed in water or other solvent at the site of use.

11. The method according to claim 9, wherein the nanofibrillar cellulose is redispersed in water or other solvent after the separation of the physical entities from the volume of solvent and after at least one of drying and comminution.

12. The method according to claim 1, wherein the physical entities in the form of separate particles are spheres, beads or flakes.

13. The method according to claim 1, wherein the aqueous gel is supplied in larger blocks to the organic solvent and broken down to smaller particles mechanically by agitating in the volume of organic solvent.

14. The method according to claim 1, wherein the aqueous gel is first disintegrated mechanically into discrete physical entities in a first volume of organic solvent, whereafter the physical entities are moved to a larger volume of organic solvent, and the water is changed with the organic solvent in the discrete physical entities of nanofibrillar cellulose in the larger volume of organic solvent.

* * * * *